United States Patent
Hughes et al.

(10) Patent No.: US 9,106,567 B2
(45) Date of Patent: Aug. 11, 2015

(54) SYSTEM AND METHOD FOR SETTING A PATH TO AN ACCESS POINT ACROSS A WIRELESS MESH NETWORK

(75) Inventors: Sterling Hughes, Oakland, CA (US); Peter Hunt, Sunnyvale, CA (US); Jana Van Greunen, Woodside, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 547 days.

(21) Appl. No.: 13/333,956

(22) Filed: Dec. 21, 2011

(65) Prior Publication Data
US 2013/0163412 A1  Jun. 27, 2013

(51) Int. Cl.
| | |
|---|---|
| H04L 12/707 | (2013.01) |
| H04L 12/721 | (2013.01) |
| H04L 12/703 | (2013.01) |
| H04W 40/04 | (2009.01) |
| H04L 12/26 | (2006.01) |
| H04W 36/30 | (2009.01) |
| H04W 40/12 | (2009.01) |
| H04W 84/18 | (2009.01) |
| H04B 7/15 | (2006.01) |
| H04W 40/26 | (2009.01) |

(52) U.S. Cl.
CPC ............ *H04L 45/24* (2013.01); *H04L 45/12* (2013.01); *H04L 45/123* (2013.01); *H04L 45/28* (2013.01); *H04W 40/04* (2013.01); *H04B 7/15* (2013.01); *H04L 43/50* (2013.01); *H04W 36/30* (2013.01); *H04W 40/12* (2013.01); *H04W 40/26* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 5,530,917 | A * | 6/1996 | Andersson et al. | 455/436 |
| 6,366,559 | B1 * | 4/2002 | Krishnan et al. | 370/230 |
| 2002/0165004 | A1 * | 11/2002 | Chen et al. | 455/522 |
| 2004/0185780 | A1 * | 9/2004 | Coupechoux et al. | 455/62 |
| 2004/0202111 | A1 * | 10/2004 | Beshai et al. | 370/237 |
| 2009/0052374 | A1 * | 2/2009 | Takeda et al. | 370/328 |
| 2010/0135195 | A1 * | 6/2010 | Sakoda | 370/311 |

OTHER PUBLICATIONS

D. Kim, D. Lee, S. Koh, Y. Kim, Adaptive Primary Path Swithcing for SCTP Handover, Feb. 20, 2008, pp. 900-902.*

* cited by examiner

*Primary Examiner* — Christopher Crutchfield
(74) *Attorney, Agent, or Firm* — Artegis Law Group, LLP

(57) ABSTRACT

A node within a wireless mesh network performs a path analysis on an advertised path to an access point that has a cost value less than the cost value of the current primary path to the access point. Depending on the cost value difference between the respective cost values of the advertised path and the current primary path, the node may perform a different type of path analysis. Based on the result of that path analysis, the node may change paths to the access point and use the advertised path as the primary path. Further, the node maintains a secondary path so that, in the event that the primary path fails, the node can default to using the secondary path.

20 Claims, 4 Drawing Sheets

SYSTEM AND METHOD FOR SETTING A PATH TO AN ACCESS POINT ACROSS A WIRELESS MESH NETWORK

BACKGROUND OF THE INVENTION

1. Field of the Invention

Embodiments of the present invention relate generally to wireless digital communication and more specifically to a system and method for setting a path to an access point across a wireless mesh network.

2. Description of the Related Art

A conventional wireless mesh network includes a plurality of nodes, each incorporating a network interface. A given node may transmit payload data to one or more neighboring nodes via the network interface. The node may originate the payload data or forward the payload data on behalf of one or more other nodes.

The wireless mesh network may include an arbitrary number of nodes and may include certain access points, configured to bridge data communications within the mesh network to a related service system, such as a wire line or optical communications network. A given node may send its payload data directly to a particular access point or may forward payload data to the access point on behalf of one or more other nodes within the wireless mesh network. Thus, each node is capable of sending data to the access point via a direct path or via one or more indirect paths (e.g. by way of intermediate nodes configured to forward received payload data). The access point collects payload data for various nodes within the wireless mesh network and then forwards the payload data to the related service system through some form of system network such as a wide-area network (WAN).

In a conventional mesh network, each node has many different neighboring nodes and may send payload data to a particular access point by way of one of those neighboring nodes. Each of those neighboring nodes uses a particular path across the wireless mesh network to the access point, and each such path has an associated cost value based on, e.g., a number of hops to reach the access point, among other possible metrics. A given node typically selects the path having the lowest cost value, and then sends payload data to the neighboring node associated with that path.

A given node may also receive advertisements from neighboring nodes, where an advertisement received from a particular neighboring node specifies the cost value of the path used by that neighboring node. In situations where a node receives an advertisement for a path that has a cost value lower than the cost value of the current path, then the node may switch paths and begin sending payload data to the access point by way of the neighboring node and the corresponding path. In doing so, the node sends a re-registration to the access point via the newly selected path.

However, problems arise in situations where the re-registration process fails. When the node fails to re-register with the access point, that node has no valid paths and may be unreachable for a certain period of time. Unreachable nodes may severely affect the throughput of the wireless mesh network.

As the foregoing illustrates, what is needed in the art is an improved technique for switching paths in a wireless mesh network.

SUMMARY OF THE INVENTION

One embodiment of the present invention sets forth a computer-implemented method for . . .

One advantage of this approach is that . . .

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

In sum, a node within a wireless mesh network performs a path analysis on an advertised path to an access point that has a cost value less than the cost value of the current primary path to the access point. Depending on the cost value difference between the respective cost values of the advertised path and the current primary path, the node may perform a different type of path analysis. Based on the result of that path analysis, the node may change paths to the access point and use the advertised path as the primary path. Further, the node maintains a secondary path so that, in the event that the primary path fails, the node can default to using the secondary path.

Figure 1:
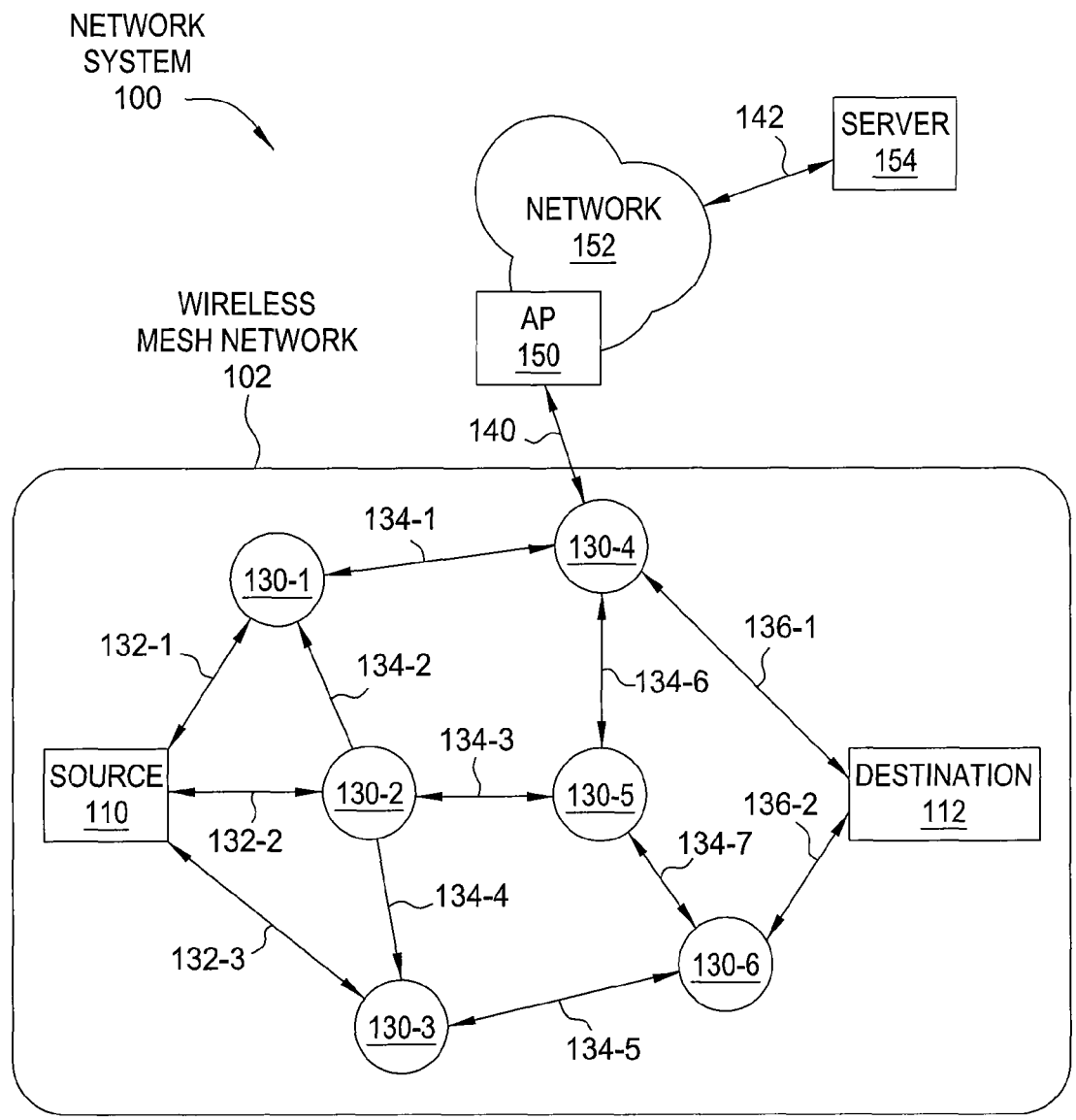
FIG. 1 illustrates a network system, according to one embodiment of the invention.

FIG. 1 illustrates a network system 100, according to one embodiment of the invention. The network system 100 comprises a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing the scope and spirit of embodiments of the present invention.

Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address.

Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address, and each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

Each node within wireless mesh network 102 is configured to select a primary path to access point 150 based on the cost value associated with that path. The cost values associated with different paths to access point 150 may be available to a given node by way of advertisements received from neighboring nodes. The advertisements disseminated by an arbitrary node specify, among other things, the cost value of a path through that node to access point 150.

In selecting a path to access point 150, a given node may compare the cost values for different paths and then select the path having the lowest cost value. For example, node 130-2 may compare the cost value associated with a first path that includes communication links 134-1, 134-2, and 140 with the cost value associated with a second path that includes communication links 134-3, 134-6, and 140. The node may then determine that the cost value associated with the first path exceeds the cost value associated with the second path. Node 130-2 may then select the second path to access point 150 as the primary path to access point 150.

In some situations, a given node within wireless mesh network 102 may switch paths and select a path advertised by a neighboring node as the primary path when that advertised path has a lower cost value than the current primary path. New paths may become available due to, e.g., unstable communication links that periodically become active or the addition of new infrastructure, among other possibilities. When a given node receives an advertisement for a path that has a lower cost value than the current path, the node performs a path analysis on the advertised path and, depending on the results of that path analysis, may set the advertised path as the primary path.

In one embodiment, the node performs the path analyses by determining that access point 150 is reachable and/or verifying the cost value associated with the advertised path. If the node determines that access point 150 is reachable and/or verifies the cost value of the advertised path, then the advertised path passes the path analysis and the node may set the advertised path as the primary path. In doing so, the node sends a re-registration to access point 150 via the advertised path. Otherwise, if the path fails the path analysis, then the node continues to send payload data via the current primary path with no downtime.

In another embodiment, the node performs the path analyses by sending test payload data across the advertised path in order to verify the integrity of that path. The amount of test payload data and/or the amount of time that the node sends the test payload data may be proportional to the difference between the cost values of the current primary path and the advertised path. If the node determines that the test payload data was delivered with sufficient reliability for a requisite amount of time, then the advertised path passes the path analysis, and the node may set the advertised path as the primary path. In doing so, the node sends a re-registration to access point 150 via the advertised path. Otherwise, if the path fails the path analysis, then node continues to send payload data via the current primary path with no downtime.

In yet another embodiment, the node performs different path analyses depending on the difference between the cost value of the current primary path and the advertised path. For example, when the node determines that the cost value difference between the current primary path and the advertised path is below a threshold value, then the node may perform a path analysis that involves determining that access point 150 is reachable and/or verifying the cost value associated with the advertised path, as described above. Alternatively, when the node determines that the cost value difference between the current primary path and the advertised path is above a threshold value, then the node may perform a path analysis that involves sending test payload data across the advertised path in order to verify the integrity of that path, as also described above. In either case, when the node determines that the advertised path passes the path analysis, then the node may select the advertised path as the primary path in the fashion described above and, in situations where the path fails the path analysis, the node continues to send payload data via the current primary path with no downtime.

Any of the nodes within wireless mesh network 102 may perform the path analysis described above with any path, and may also perform the path analysis when switching paths from a first access point to another access point. In addition, each node may maintain both a primary path and a secondary path. The primary path could represent a path to access point 150 having the lowest cost value compared to other paths to access point 150, while the secondary path could represent a "backup" path to access point 150. In situations where the primary path loses the capacity to deliver payload data to access point 150, the node may immediately default to using the secondary path. The various embodiments of the path analysis described above, as well as the primary and secondary paths that may be implemented by a node within wireless mesh network 102, are described in greater detail below in conjunction with FIGS. 3-4.

In network system 100, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 is coupled to the server 154 via communications link 142. The access point 150 is coupled to the network 152, which may comprise any wired, optical, wireless, or hybrid network configured to transmit payload data between the access point 150 and the server 154.

In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

The techniques described herein are sufficiently flexible to be utilized within any technically feasible network environment including, without limitation, a wide-area network (WAN) or a local-area network (LAN). Moreover, multiple network types may exist within a given network system 100. For example, communications between two nodes 130 or between a node 130 and the corresponding access point 150 may be via a radio-frequency local-area network (RF LAN), while communications between access points 150 and the network may be via a WAN such as a general packet radio service (GPRS). As mentioned above, each node within wireless mesh network 102 includes a network interface that enables the node to communicate wirelessly with other nodes. An exemplary network interface is described below in conjunction with FIG. 2.

Figure 2:
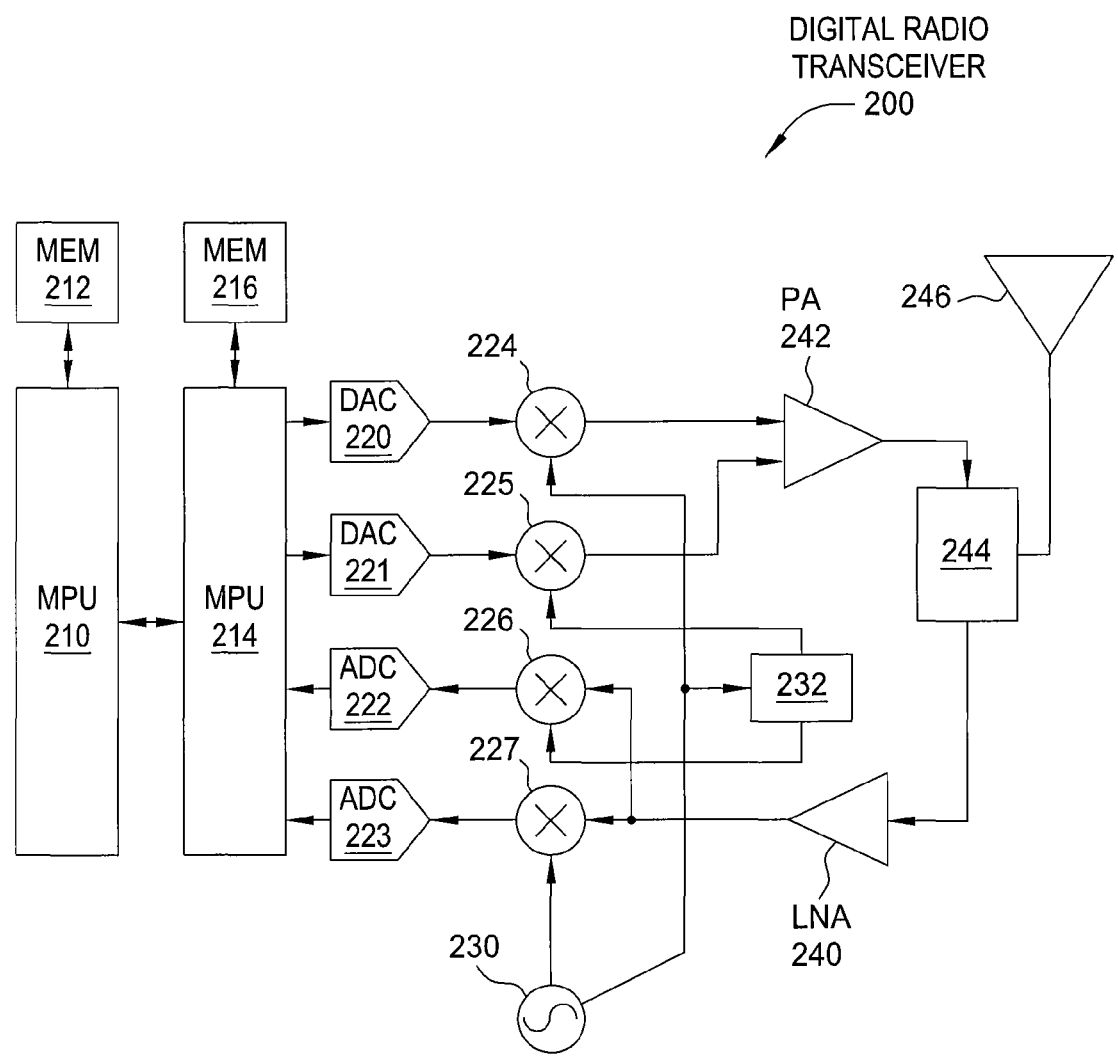
FIG. 2 illustrates a network interface configured to transmit and receive data within a mesh network, according to one embodiment of the invention.

FIG. 2 illustrates a network interface 200 configured to implement multi-channel operation, according to one embodiment of the invention. Each node 110, 112, 130 within the wireless mesh network 102 of FIG. 1 includes at least one instance of the network interface 200. The network interface 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage. Memory 212 and/or memory 216 may be used to store data structures such as, e.g., a forwarding database, and/or routing tables that include primary and secondary path information, path cost values, and so forth.

In one embodiment, the MPU 210 implements procedures for processing IP packets transmitted or received as payload data by the network interface 200. The procedures for processing the IP packets may include, without limitation, wireless routing, encryption, authentication, protocol translation, and routing between and among different wireless and wired network ports. In addition, MPU 210 is configured to perform the path analysis described above in conjunction with FIG. 1. In doing so, MPU 210 may evaluate the cost value of any relevant paths within wireless mesh network 102, evaluate the cost value difference between any relevant paths within wireless mesh network 102, send test payload data, and select between primary and secondary paths maintained by network interface 200, as described above in conjunction with FIG. 1, and as described in greater detail below in conjunction with FIGS. 3-4. In one embodiment, the techniques performs by the node in conjunction with FIGS. 1-4 are implemented by MPU 210 when MPU 210 executes a firmware program stored in memory within network interface 200.

The DSP 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values. Persons having ordinary skill in the art will recognize that network interface 200 represents just one possible network interface that may be implemented within wireless mesh network 102 shown in FIG. 1, and that any other technically feasible device for transmitting and receiving data may be incorporated within any of the nodes within wireless mesh network 102.

Figure 3:
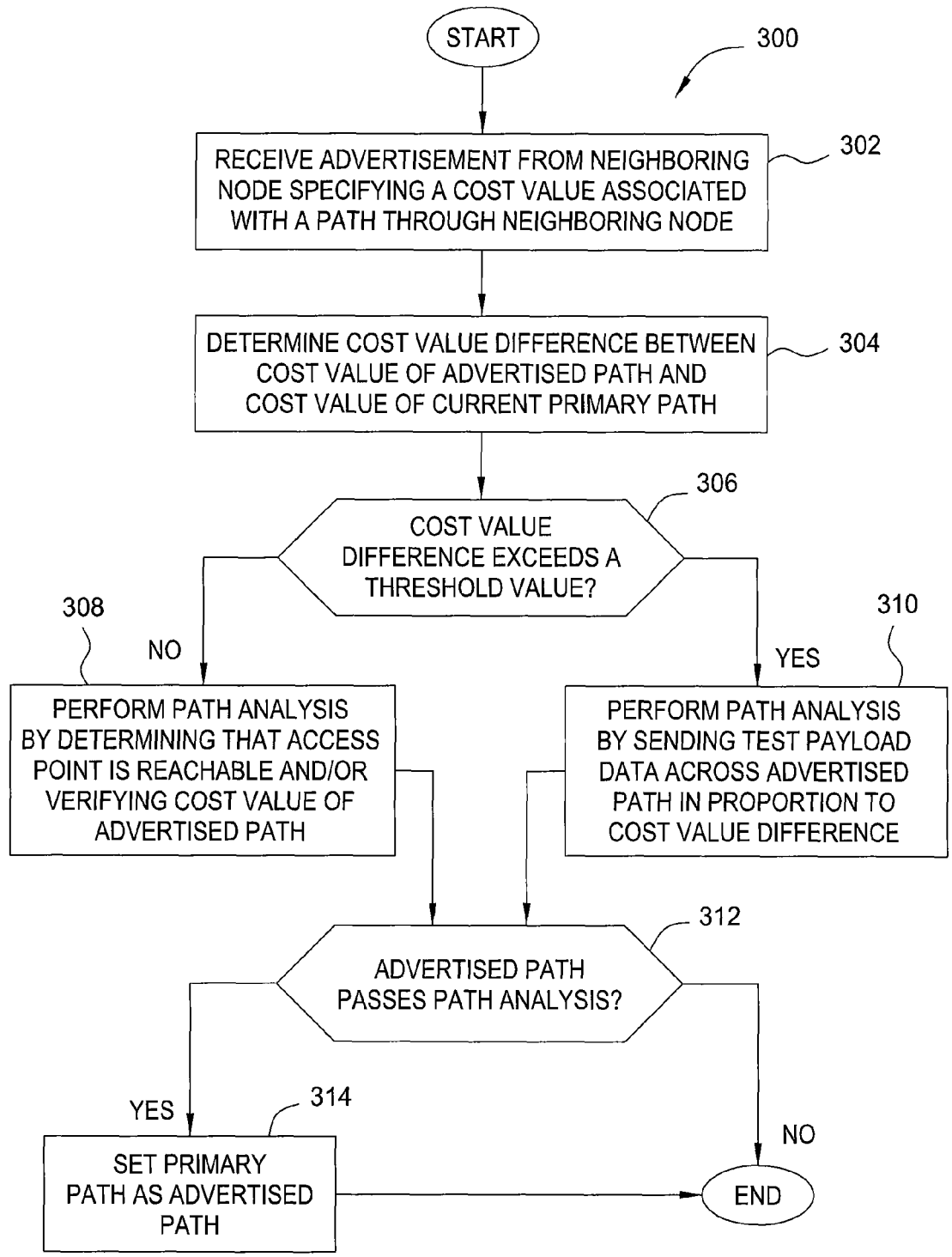
FIG. 3 is a flowchart of method steps for setting a primary path to an access point, according to one embodiment of the invention.

FIG. 3 is a flowchart of method steps for setting a primary path to an access point, according to one embodiment of the invention. Although the method 300 is described in conjunction with the systems of FIGS. 1-2, persons of ordinary skill in the art will understand that any system configured to perform the steps of method 300, in any order, is within the scope of the present invention. The method 300 may be performed by any of the nodes within wireless mesh network 102, including nodes 110, 112, or 130.

As shown, the method 300 begins at step 302, where a given node within wireless mesh network 102 receives an advertisement from a neighboring node specifying a cost value associated with a path through the neighboring node to an access point, such as access point 150 shown in FIG. 1. The cost value associated with the path to the access point could be based on, e.g., individual cost values associated with each communication link within that path.

At step 304, the node determines a cost value difference between the cost value of the advertised path and the cost value of the current primary path. The node may be configured to maintain cost value information for different paths to one or more different access points within routing tables stored in memory included within the node, as discussed above in conjunction with FIG. 2. The cost value difference determined by the node could be determined as, e.g., a numeric difference between cost values.

At step 306, the node determines whether the cost value difference exceeds a threshold value. The threshold value could be a parameter stored in memory within the node, or could be calculated dynamically based on current network characteristics. If the node determines that the cost value difference does not exceed the threshold value, then the method 300 proceeds to step 308. At step 308, the node performs a path analysis on the advertised path by determining that the access point is reachable and/or verifying the cost value of the advertised path. The method 300 then proceeds to step 312.

If at step 306 the node determines that the cost value difference does not exceed the threshold value, then the method 300 proceeds to step 310, where the node performs a path analysis by sending test payload data across advertised path in proportion to the cost value difference determined at step 304. In doing so, the node may send an amount of test payload data that is proportional to the cost value difference and/or may send test payload data for an amount of time that is proportional to the cost value difference. The method 300 then proceeds to step 312.

At step 312, the node determines whether the advertised path passed the path analysis performed at either step 308 or step 310. The node may determine whether the advertised path passed the path analysis differently depending on whether step 308 or step 310 was implemented, as also described above in conjunction with FIG. 1. If the node determines that the advertised path did not pass the path analysis, then the node leaves the primary path unmodified and the method 300 ends. Otherwise, if the node determines at step 312 that the advertised path passed the path analysis, then the method 300 proceeds to step 314, where the node sets the primary path as the advertised path. In doing so, the node may send a re-registration to the access point via the new primary path (i.e. the advertised path). The method 300 then ends.

By implementing the method 300 with one or more advertised paths, the node may periodically analyze different paths to the access point and identify the path having the least cost value. Further, a given node may perform the method 300 when switching between access points, and may thus identify a path to any available access point having the least cost value relative to other paths to available access points. A given node may perform the method 300 in conjunction with additional methods for selecting primary paths, such as the method 400 described below in conjunction with FIG. 4.

Figure 4:
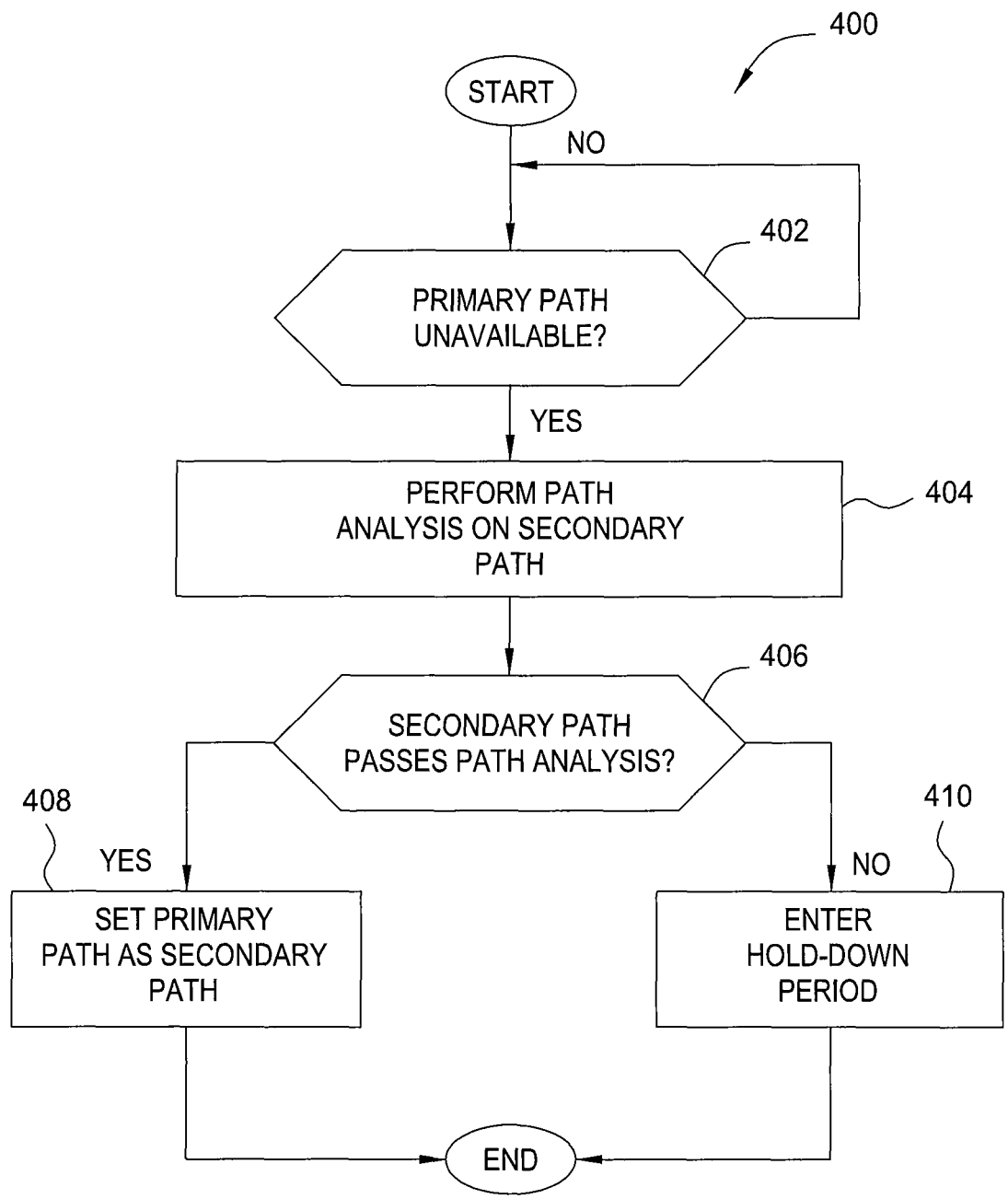
FIG. 4 is a flowchart of method steps for defaulting from a primary path to an access point to a secondary path to the access point, according to one embodiment of the invention.

FIG. 4 is a flowchart of method steps for defaulting from a primary path to an access point to a secondary path to the access point, according to one embodiment of the invention. Although the method 400 is described in conjunction with the systems of FIGS. 1-2, persons of ordinary skill in the art will understand that any system configured to perform the steps of method 400, in any order, is within the scope of the present invention. The method 400 may be performed by any of the nodes within wireless mesh network 102, including nodes 110, 112, or 130.

The method 400 begins at step 402, where a given node within wireless mesh network 102 determines whether the primary path to a particular access point is unavailable. The node may repeat step 402 periodically until, at step 402, the node determines that the primary path is unavailable. The method 400 then proceeds to step 404, where the node performs a path analysis on a secondary path stored in memory within the node. The path analysis could be, e.g., either of the path analyses according to steps 308 and 310 of the method 300 described above in conjunction with FIG. 3. In one embodiment, the node performs a different one of those path analyses based on the cost value difference between the primary path and the secondary path, in like fashion as described according to step 306 of the method 300.

At step 406, the node determines whether the secondary path passes the path analysis performed at step 404. If the node determines that the secondary path passed the path analysis, then at step 408 the node sets the primary path as the secondary path. In doing so, the node may update routing tables stored in memory to replace the primary path with the secondary path. The method 400 then ends.

If at step 406 the node determines that the secondary path did not pass the path analysis performed at step 410, then the method 400 proceeds to step 410, where the node enters a hold-down period, after which the method 400 ends. The hold-down period could last for a configurable amount of time or could be determined dynamically based on current network characteristics, among other things. During the hold-down period, the node may be unreachable and may not be capable of sending or forwarding any payload data. The hold-down period may also end when the node identifies a suitable path to an access point.

By implementing the method 400, either alone or in conjunction with the method 300 described above in conjunction with FIG. 3, a node within wireless network 102 maintains a secondary "default" path that may be used in the event that the primary path fails.

Advantageously, the robustness of a wireless mesh network can be improved by implementing nodes within that network that (i) perform a path analysis on an advertised path to an access point before actually using that path as the primary path and (ii) maintaining both primary and secondary paths so that, in the event that the primary path fails, the node may default to using the secondary path.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for determining a primary path across a network between a first node within the network and an access point coupled to the network, the method comprising:
    receiving an advertisement for a first path to the access point that traverses a neighboring node of the first node;
    determining a cost value difference based on a cost value associated with the primary path and a cost value associated with the first path;
    based on the cost value difference, identifying a first type of path analysis included in a plurality of different types of path analyses to perform on the first path;
    performing the first type of path analysis on the first path;
    determining whether the first path passes the first type of path analysis; and
    designating the first path to be the primary path if the first path passes the first type of path analysis, or maintaining an existing path as the primary path if the first path does not pass the first type of path analysis.

2. The method of claim 1, wherein the first node maintains both the primary path to the access point and a default path to the access point, and further comprising:
    determining that the primary path is unavailable;
    performing a path analysis on the default path;
    determining that the default path passes the path analysis; and
    designating the default path as a new primary path.

3. The computer-implemented method of claim 1, wherein the existing path already couples the node to the access point or couples the node to a different access point that also is associated with the network.

4. A computer-implemented method for determining a primary path across a network between a first node within the network and an access point coupled to the network, the method comprising:
    receiving an advertisement for a first path to the access point that traverses a neighboring node of the first node;
    determining a cost value difference based on a cost value associated with the primary path and a cost value associated with the first path;
    performing a path analysis on the first path based on the cost value difference;
    determining whether the first path passes the path analysis; and
    designating the first path to be the primary path if the first path passes the path analysis, or maintaining an existing path as the primary path if the first path does not pass the path analysis,
    wherein performing the path analysis on the first path comprises:
        comparing the cost value difference to a threshold value; and
        performing a first path analysis if the cost value difference is less than the threshold value or performing a second path analysis if the cost value difference is greater than the threshold value.

5. The computer-implemented method of claim 4, wherein the first path is determined to pass the first path analysis upon verifying that the access point is reachable across the first path and/or verifying the cost value associated with the first path.

6. The computer-implemented method of claim 4, wherein the first path is determined to pass the second path analysis upon sending test payload data across the first path proportionally to the cost value difference and determining that test payload data is delivered to the access point with at least a threshold amount of reliability.

7. The computer-implemented method of claim 6, wherein sending test payload data across the first path comprises sending an amount of test payload data across the first path that is proportional to the cost value difference and/or sending test payload data across the first path for an amount of time that is proportional to the cost value difference.

8. A non-transitory computer-readable medium storing program instructions that, when executed by a processing unit, cause the processing unit to determine a primary path across a network between a first node within the network and an access point coupled to the network, by performing the steps of:
    receiving an advertisement for a first path to the access point that traverses a neighboring node of the first node;
    determining a cost value difference based on a cost value associated with the primary path and a cost value associated with the first path;
    based on the cost value difference, identifying a first type of path analysis included in a plurality of different types of path analyses to perform on the first path;
    performing the first type of path analysis on the first path;
    determining whether the first path passes the first type of path analysis; and
    designating the first path to be the primary path if the first path passes the first type of path analysis, or maintaining an existing path as the primary path if the first path does not pass the first type of path analysis.

9. The non-transitory computer-readable medium of claim 8, wherein the first node maintains both the primary path to the access point and a default path to the access point, and further comprising the steps of:
    determining that the primary path is unavailable;
    performing a path analysis on the default path;
    determining that the default path passes the path analysis; and
    designating the default path as a new primary path.

10. The non-transitory computer-readable medium of claim 8, wherein the existing path already couples the node to the access point or couples the node to a different access point that also is associated with the network.

11. A computing device configured to determine a primary path across a network between a first node within the network and an access point coupled to the network, including:
    a processing unit associated with the first node and configured to:
        receive an advertisement for a first path to the access point that traverses a neighboring node of the first node;
        determine a cost value difference based on a cost value associated with the primary path and a cost value associated with the first path;
        based on the cost value difference, identify a first type of path analysis included in a plurality of different types of path analyses to perform on the first path;
        perform the first type of path analysis on the first path;
        determine whether the first path passes the first type of path analysis; and
        designate the first path to be the primary path if the first path passes the first type of path analysis, or maintaining an existing path as the primary path if the first path does not pass the first type of path analysis.

12. The computing device of claim 11, further comprising:
    a memory coupled to the processing unit and storing program instructions that, when executed by the processing unit, cause the processing unit to:
    receive the advertisement;
    determine the cost value difference;
    based on the cost value difference, identify the first type of path analysis;
    perform the first type of path analysis;
    determine whether the first path passes the first type of path analysis; and
    designate the first path to be the primary path if the first path passes the first type of path analysis, or maintain an existing path as the primary path if the first path does not pass the first type of path analysis.

13. The computing device of claim 11, wherein the existing path already couples the node to the access point or couples the node to a different access point that also is associated with the network.

14. A non-transitory computer-readable medium storing program instructions that, when executed by a processing unit, cause the processing unit to determine a primary path across a network between a first node within the network and an access point coupled to the network, by performing the steps of:
    receiving an advertisement for a first path to the access point that traverses a neighboring node of the first node;
    determining a cost value difference based on a cost value associated with the primary path and a cost value associated with the first path;
    performing a path analysis on the first path based on the cost value difference;

determining whether the first path passes the path analysis; and designating the first path to be the primary path if the first path passes the path analysis, or maintaining an existing path as the primary path if the first path does not pass the path analysis, wherein performing the path analysis on the first path comprises:

comparing the cost value difference to a threshold value; and performing a first path analysis if the cost value difference is less than the threshold value or performing a second path analysis if the cost value difference is greater than the threshold value.

15. The non-transitory computer-readable medium of claim 14, wherein the first path is determined to pass the first path analysis upon verifying that the access point is reachable across the first path and/or verifying the cost value associated with the first path.

16. The non-transitory computer-readable medium of claim 14, wherein the first path is determined to pass the second path analysis upon sending test payload data across the first path proportionally to the cost value difference and determining that test payload data is delivered to the access point with at least a threshold amount of reliability.

17. The non-transitory computer-readable medium of claim 16, wherein sending test payload data across the first path comprises sending an amount of test payload data across the first path that is proportional to the cost value difference and/or sending test payload data across the first path for an amount of time that is proportional to the cost value difference.

18. A computing device configured to determine a primary path across a network between a first node within the network and an access point coupled to the network, including:

a processing unit associated with the first node and configured to:

receive an advertisement for a first path to the access point that traverses a neighboring node of the first node;

determine a cost value difference based on a cost value associated with the primary path and a cost value associated with the first path;

perform a path analysis on the first path based on the cost value difference;

determine whether the first path passes the path analysis; and designate the first path to be the primary path if the first path passes the path analysis, or maintaining an existing path as the primary path if the first path does not pass the path analysis, wherein the computing device performs the path analysis on the first path by:

comparing the cost value difference to a threshold value; and performing a first path analysis if the cost value difference is less than the threshold value or performing a second path analysis if the cost value difference is greater than the threshold value, wherein the computing device determines that the first path passes the first path analysis upon verifying that the access point is reachable across the first path and/or verifying the cost value associated with the first path, and wherein the computing device determines that the first path passes the second path analysis upon sending test payload data across the first path proportionally to the cost value difference and determining that test payload data is delivered to the access point with at least a threshold amount of reliability.

19. The computing device of claim 18, wherein the computing device sends test payload data across the first path by sending an amount of test payload data across the first path that is proportional to the cost value difference and/or sending test payload data across the first path for an amount of time that is proportional to the cost value difference.

20. The computing device of claim 18, wherein the first node maintains both the primary path to the access point and a default path to the access point, and the computing device is further configured to:

determine that the primary path is unavailable;
perform a path analysis on the default path;
determine that the default path passes the path analysis; and
designate the default path as a new primary path.

* * * * *